US012798508B2

(12) United States Patent
Martin Mariño

(10) Patent No.: US 12,798,508 B2
(45) Date of Patent: Nov. 17, 2026

(54) AIR BAG FIXATION

(71) Applicant: Illinois Tool Works Inc., Glenview, IL (US)

(72) Inventor: Ivan Martin Mariño, Sabadell (ES)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/948,150

(22) Filed: Nov. 14, 2024

(65) Prior Publication Data

US 2026/0152142 A1 Jun. 4, 2026

(30) Foreign Application Priority Data

Nov. 27, 2023 (EP) .................................... 23212426
Nov. 8, 2024 (DE) ..................... 10 2024 132 739.1

(51) Int. Cl.
*B60R 21/20* (2011.01)

(52) U.S. Cl.
CPC .................................. *B60R 21/20* (2013.01)

(58) Field of Classification Search
CPC .................................................. B60R 21/2171
See application file for complete search history.

(56) References Cited

U.S. PATENT DOCUMENTS 2,590,264 A * 3/1952 Meyers .................. F16B 21/07 411/908
4,865,505 A * 9/1989 Okada ................ B60R 13/0206 411/512
5,249,900 A * 10/1993 Mitts .................... F16B 37/043 411/182
5,722,124 A * 3/1998 Wisniewski .......... F16B 21/086 24/295
6,565,116 B1 * 5/2003 Tajima .................. F16B 21/075 24/297
6,571,436 B2 * 6/2003 Gombert ................ F16B 21/07 24/666
7,178,850 B2 * 2/2007 Smith ..................... B60R 11/00 24/297
7,287,945 B2 * 10/2007 Lubera .................. F16B 5/0664 24/295
7,828,372 B2 * 11/2010 Ellison .................... B60R 13/04 24/297
8,875,357 B2 * 11/2014 Reznar .................. F16B 5/065 24/453
9,341,204 B2 * 5/2016 Fischer ................. F16B 5/0642
(Continued)

FOREIGN PATENT DOCUMENTS

CN 119267391 A * 1/2025 ................ F16B 2/02
DE 102011100235 A1 * 11/2012 ............. F16B 2/243
(Continued)

*Primary Examiner* — Nicole T Verley
(74) *Attorney, Agent, or Firm* — McAndrews, Held & Malloy, Ltd.

(57) ABSTRACT

Disclosed is an air bag fixation (104) suitable to attach an air bag (102) to a substrate (202). The air bag fixation comprises a cage arranged to receive a stud (302) of an air bag, at least one resilient barb (108) arranged to catch a substrate, at least one distance regulator arranged to, in use, maintain the substrate a predetermined distance from the air bag, and at least one resilient member 110 arranged to hold the position of the air bag fixation relative to a curved surface of the air bag.

20 Claims, 6 Drawing Sheets

(56) References Cited

U.S. PATENT DOCUMENTS

| | | | | | |
|---|---|---|---|---|---|
| 10,590,968 | B2 * | 3/2020 | Benedetti | F16B 2/245 | |
| 10,800,371 | B2 * | 10/2020 | Marini | F16B 21/065 | |
| D1,039,957 | S * | 8/2024 | Dickey | D8/382 | |
| 12,123,445 | B2 * | 10/2024 | Murray | F16M 13/02 | |
| 12,123,447 | B2 * | 10/2024 | Murray | F16B 2/22 | |
| D1,065,996 | S * | 3/2025 | Beyer | D8/395 | |
| 12,546,347 | B2 * | 2/2026 | Diez Herrera | F16B 2/243 | |
| 12,553,457 | B2 * | 2/2026 | Li | B60R 13/0206 | |
| 2007/0158931 | A1 * | 7/2007 | Baumgartner | B60R 21/20 | 403/294 |
| 2007/0220716 | A1 * | 9/2007 | Hansen | B60R 21/213 | 24/297 |
| 2012/0240363 | A1 * | 9/2012 | Lee | F16B 21/086 | 24/297 |
| 2016/0356298 | A1 * | 12/2016 | Pquet | F16B 21/065 | |
| 2020/0232495 | A1 * | 7/2020 | Lepper | F16B 5/0628 | |
| 2020/0392973 | A1 * | 12/2020 | Ammann | F16B 5/0642 | |
| 2024/0018983 | A1 * | 1/2024 | Murray | F16B 21/086 | |
| 2024/0035501 | A1 * | 2/2024 | Dickinson | F16B 5/065 | |
| 2024/0060522 | A1 * | 2/2024 | Ribes Martí | F16B 21/075 | |
| 2024/0109501 | A1 * | 4/2024 | Li | B60R 13/0206 | |
| 2025/0102005 | A1 * | 3/2025 | Ribes Martí | B60R 7/08 | |

FOREIGN PATENT DOCUMENTS

| | | | | |
|---|---|---|---|---|
| DE | 102021203314 | B4 * | 11/2022 | B60R 21/20 |
| EP | 4253769 | A1 * | 10/2023 | F16B 21/086 |
| EP | 4279752 | A1 | 11/2023 | |
| EP | 3830431 | B1 * | 12/2023 | F16B 21/075 |
| JP | 2006118679 | A * | 5/2006 | |
| JP | 5144640 | B2 * | 2/2013 | B60R 21/213 |
| WO | WO-2012150004 | A1 * | 11/2012 | F16B 21/086 |
| WO | WO-2017016652 | A1 * | 2/2017 | F16B 21/075 |

* cited by examiner

AIR BAG FIXATION

RELATED APPLICATIONS

The present application claims the benefit of European Patent Application No. EP 23212426.3, filed Nov. 27, 2023, and German Patent Application No. DE 10 2024 132 739.1, filed Nov. 8, 2024, each titled "Air Bag Fixation," the contents of which are hereby incorporated by reference.

TECHNICAL FIELD

The disclosure relates to an air bag fixation. The air bag fixation is suitable to attach an air bag to a substrate. In particular, the disclosure relates to an air bag fixation which does not require a third-party fixing and has easy attachment.

BACKGROUND

Known air bags fasten to a structure such as a vehicle chassis via a screw and nut or other traditional means. This may involve a welding operation for assembly, such as welding a backing nut to the body in white of a vehicle. The air bag must then be screwed onto the backing nut, via a screw. An operative must use a tool to attach the air bag. This complicates manufacturing and is time-consuming.

It is therefore necessary to provide third party fixations with the air bag. These can be lost in transit or during use (e.g. Falling into an inaccessible area). The air bag can also be located in an awkward position within the vehicle, this makes the use of third-party fixations difficult (e.g. When upside down or in a tight space).

Screw and the like can also be difficult to remove for replacement and service of parts and are prone to stripping, breaking, and/or ceasing.

SUMMARY

The present disclosure relates generally to air bag fixation, substantially as illustrated by and described in connection with at least one of the figures, as set forth more completely in the claims.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
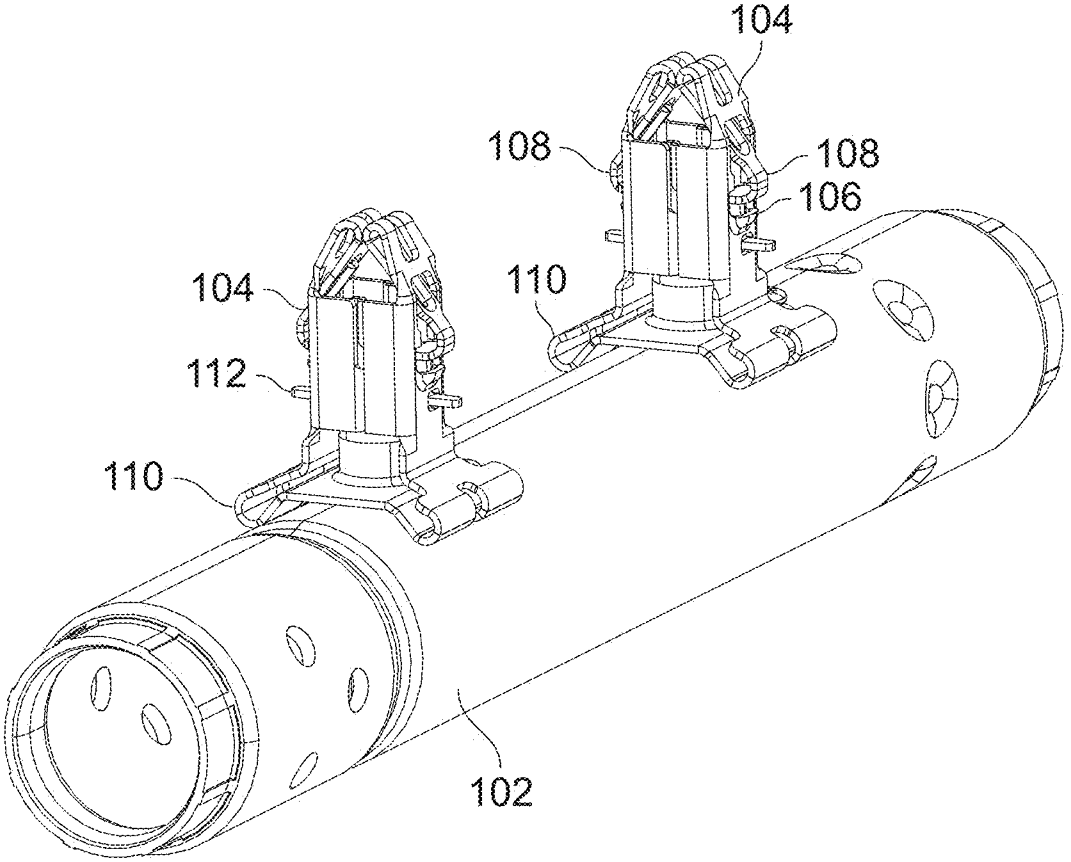
FIG. 1 illustrates an example aspect of an air bag fixation.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly', 'outer' and 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled' and 'mounted' are intended to include direct connections between two members without any other members interposed therebetween, as well as indirect connections between members in which one or more other members are interposed therebetween. The terminology includes the words specifically mentioned above, derivatives thereof, and words of similar import.

Further, unless otherwise specified, the use of ordinal adjectives, such as, "first", "second" and "third" etc. merely indicate that different instances of like objects are being referred to and are not intended to imply that the objects so described must be in a given sequence, either temporally, spatially, in ranking or in any other manner.

Like reference numerals are used to depict like features throughout.

The illustrated example aspect(s) relates to air bag fixations, and in particular to air bag fixations that are installed to an air bag, and then to a structure, such as, for example, a chassis of a vehicle, thus, providing improved ease of use during installation as no tools are required or extra fixings.

According to the disclosure there is provided an air bag fixation suitable to attach an air bag (that is the pre-deployed air bag container containing the fabric and detonator to activate the air bag) to a substrate (such as the body in white or chassis of a vehicle). The air bag fixation comprises: a cage arranged to receive a stud of an air bag. The stud is normally located on an exterior of the casing of the air bag module and is typically formed of metal. The air bag fixation has at least one resilient barb which is arranged to catch the substrate. The air bag fixation, in use is urged through an aperture of the substrate which approximates an exterior cross section of the air bag fixation, the at least one resilient barb is able to resiliently deform to allow it to pass through the substrate and then return to its original resting position, in which the barb is unable to return through the aperture. At least one distance regulator is provided and arranged to, in use, maintain the substrate a predetermined distance from the air bag, this is important due to the rapid change in temperature which the air bag module can product upon detonation, also to isolate the air bag module to prevent accidental detonation (e.g. Through electrical current leakage). While spaced apart, the air bag module must also be adequately fixed in place and accidental detachment (through e.g. Vehicular vibrations) avoided. At least one resilient member is also present and arranged to hold the position of the air bag fixation relative to a curved surface of the air bag, in further prevention of accidental disconnection of the air bag module from the fixation or the substrate.

Suitably, the cage comprises an attachment mechanism to adhere the cage to the stud, so third party fixations are avoided, no additional fixations are required. Optionally, the attachment mechanism is a reversible attachment mechanism so the cage can be removed from the stud. Further optionally the attachment mechanism is a threaded aperture and/or a snap fitment such that the fixation can be cinched down onto the stud via screwing on (rotating the cage about the stud) or press fitment with e.g. A snap fit feature gripping recess, mushroom head, or the like of the stud.

Appropriately, the resilient barb is formed integrally with the cage. The cage may be formed of a single piece of material in a single manufacturing process, such as stamping or folding. This ensures that every cage is provided automatically with a barb and there is no risk of the parts of the fixation disassociating in transit or prior to use.

Appositely, the resilient barb comprises a ramped catchment surface. The ramped catchment surface is arranged to bite or otherwise interfere, in use, with the substrate. By arranging the ramped catchment surface at a non-parallel angle to a main surface of substrate and/or forming the ramped catchment surface from a wedge shape of material, a variety of substrate thicknesses can be accommodated by the fixation as still adequately connected to by the fixation.

Suitably, the at least one distance regulator is arranged, in use, between the at least one resilient barb and the at least one resilient member in order to ensure that the air bag module and the substrate are maintained a fixed distance from one another.

Preferably, the at least one distance regulator is formed integrally with the cage in the same manufacturing process as discussed above. Optionally the at least one distance regulator is an arrestor, which may take the form of an ear of material which is arranged in opposition to a resting position of one or more resilient barbs.

Appropriately, the at least one distance regulator is a spacer arranged to locate about the cage. Here the spacer is a separate part formed independently of the fixation. The fixation may be provided with the spacer already located upon the fixation (even if not in its final intended position). The spacer may provide a location function into the substrate and/or a communication function to an operative on the successful installation of the fixation via an audible or tactile que. The spacer holds the substrate away from the air bag module due to the bulk of material from which the space is formed. Altering the dimensions of the spacer therefore alters the distance between the air bag and the substrate. Optionally or alternatively, the spacer may at least partially surround the cage, the spacer may be provided as a piece of material having an aperture corresponding to an external shape of the cage, or a crevice which describes at least part of, or is compatible to fit about, the external shape of the cage.

Suitably, the spacer comprises a planar surface arranged opposite a curved face, such that the spacer is provided with mating surfaces that describe, or are otherwise complementary with, the surfaces the spacer is intended to mate with, in order to provide a supportive surface to each of the substrate and the air bag respectively. Optionally, when observed from the outside, the curved face is concave to match the convex exterior of the air bag module.

Preferably, the spacer further comprises a nose arranged to be located within an aperture of a substrate. The nose therefore provides a locating feature for the substrate to ensure proper alignment of at least the spacer, and optionally the cage, with the substrate. Optionally the nose comprises one or more grasping fingers arranged to grip the substrate, thereby ensuring the position of the spacer relative to the substrate may not change during installation of the fixation. Preferably, in this instance, the spacer is provided upon an end of the fixation that is intended for first insertion into the substrate, before other elements of the fixation. The installation process then shifts the position of the spacer relative to the fixation into a final resting place. Optionally and/or alternatively, the nose comprises one or more abutment surfaces arranged to cooperate with a resilient barb.

Appropriately, the at least one resilient member is formed integrally with the cage in the same manufacturing process as discussed above. Optionally the at least one resilient member, in use, urges the cage away from a curved surface of the air bag so as to absorb any slack movement or play as well as to absorb any vibrations between the parts.

Suitably, the air bag fixation is at least partially coated with a coating and optionally wherein the coating has dielectric properties, and optionally wherein the coating is an electrically resistive coating. As the air bag module receives an electrical signal to detonate it is important the airbag module is electrically isolated and protected from stray electric currents. Coating the fixation with a dielectric coating (that is one having a very high resistance to conducting electricity) achieves this aim.

Preferably, an exterior cross section of the cage describes a polygon, and optionally wherein the cross section of the cage describes a quadrilateral, in particular a square. This is so the cage can pass through a polygonal aperture of the substrate and play between the parts are minimized as the shapes are complementary.

Appropriately, the air bag fixation is a reversible air bag fixation this means the fixation can be detached from the air bag module and/or from the substrate. The fixation may be re-useable following such detachment. Optionally, wherein the air bag fixation comprises a removal tab arranged to urge at least one resilient barb towards an interior of the cage. The removal tab allows a user to intentionally deform (reversibly or otherwise) the barbs to place the barbs into a position which does not interfere with the substrate, the substrate may therefore pass over the barbs and allows the fixation to be removed from the substrate.

FIG. 1 shows an aspect of an air bag 102 (or air bag module) comprising two air bag fixations 104 attached to studs 302 on the air bag. The air bag fixations have resilient members 110 sandwiched between the fixations and the air bag to ensure play between the parts is minimized. The fixations are provided with resilient barbs 108 to pass through an aperture 304 of the substrate 202 and then not return therethrough without external input. One or more arrestors 106 are provided adjacent the barbs such that continued travel of the air bag fixation 104 through the aperture 304 is prevented ensuring that the substrate is held a fixed distance from the air bag by the air bag fixations.

As the air bag can be pre-provided with the fixations, the air bag is placed into a ready to assemble state with no further fixings, assembly is intuitive, merely requiring one part to be urged towards another, simplifying assembly.

The fixations may be provided with a coating having dielectric properties to resist conduction of electricity across the fixation, thereby electrically isolating the air bag from the substrate. The fixation may, nevertheless, be formed of a metal.

The fixation may be easily removed by reversing the assembly process.

No particular fixing is required on the chassis, other than an aperture 304 sized to receive the fixation 402. There is no need for a welded nut or the like on the body in white. The aperture may take the form of a square or other shape corresponding to the cross section of the fixation. Multiple fixations may be used on the air bag, as shown in the figures, or a single fixation may be sufficient.

The omission of separate multi-part fixations (such as a nut and bolt) reduces construction time and weight.

Figure 2A:
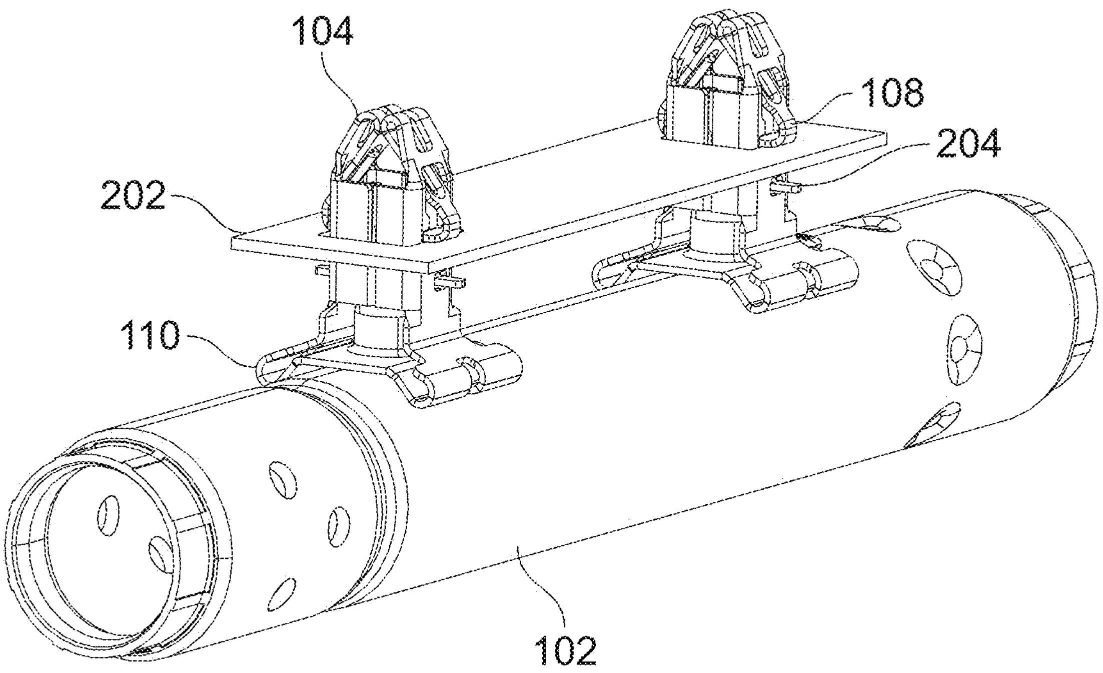
FIGS. 2*a* and 2*b* illustrate, respectively, (a) a first perspective view of an air bag fixation attached to a substrate (e.g. car chassis) and (b) a second perspective view of an air bag fixation attached to a substrate (e.g. car chassis).
Figure 2B:
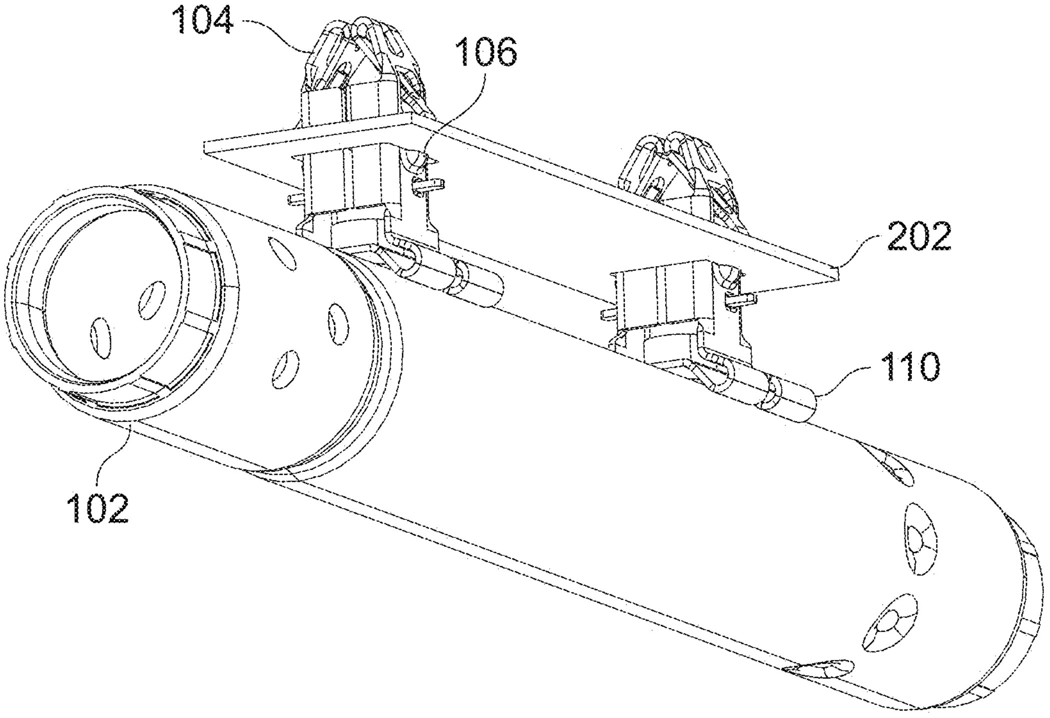

FIGS. 2(*a*) and (*b*) shows the air bag fixations 104 attached to the air bag 102 and the substrate 202 with the resilient barbs 108 preventing return of the fixation through the aperture and the arrestors 106 preventing further travel of the fixation through the aperture.

Figure 3A:
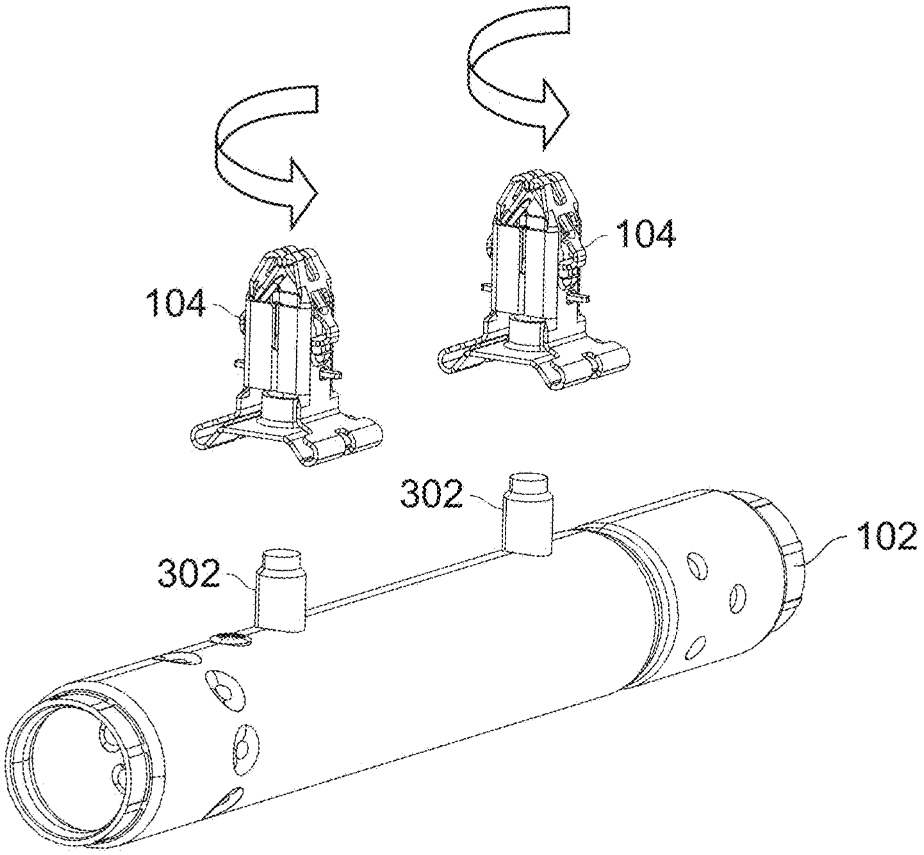
FIGS. 3*a* and 3*b* illustrate the use of the air bag fixation according to an aspect that, respectively, is (a) attaching the fixations to the studs of an air bag and (b) attaching the air bag, via the air bag fixations, to the substrate (e.g. car chassis).
Figure 3B:
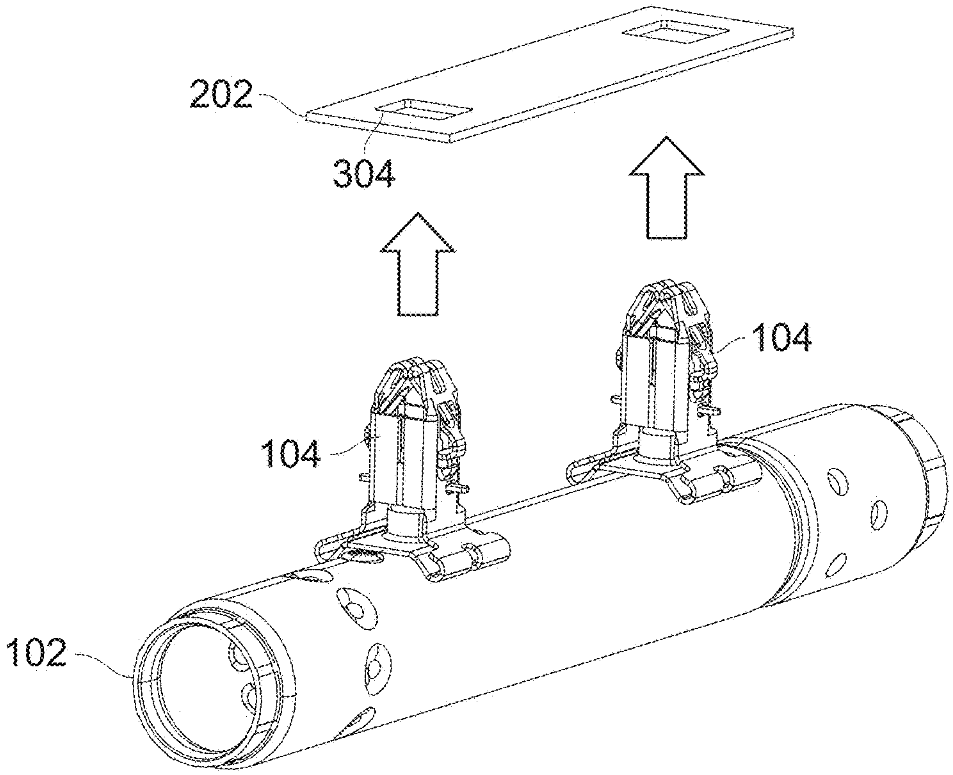

FIG. 3 shows the assembly process. FIG. 3(*a*) shows the attachment of the air bag fixation 104 to the air bag by e.g. rotation (a snap-fit may also be used as described above), the curved surface of the air bag abutting the resilient members 110 prevent reverse rotation once the fixation is cinched down sufficiently. FIG. 3(*b*) shows the insertion of the fixation into the apertures 304 of the chassis substrate 202, thereby forming the assembly shown in FIGS. 2(*a*) and (*b*).

Figure 4:
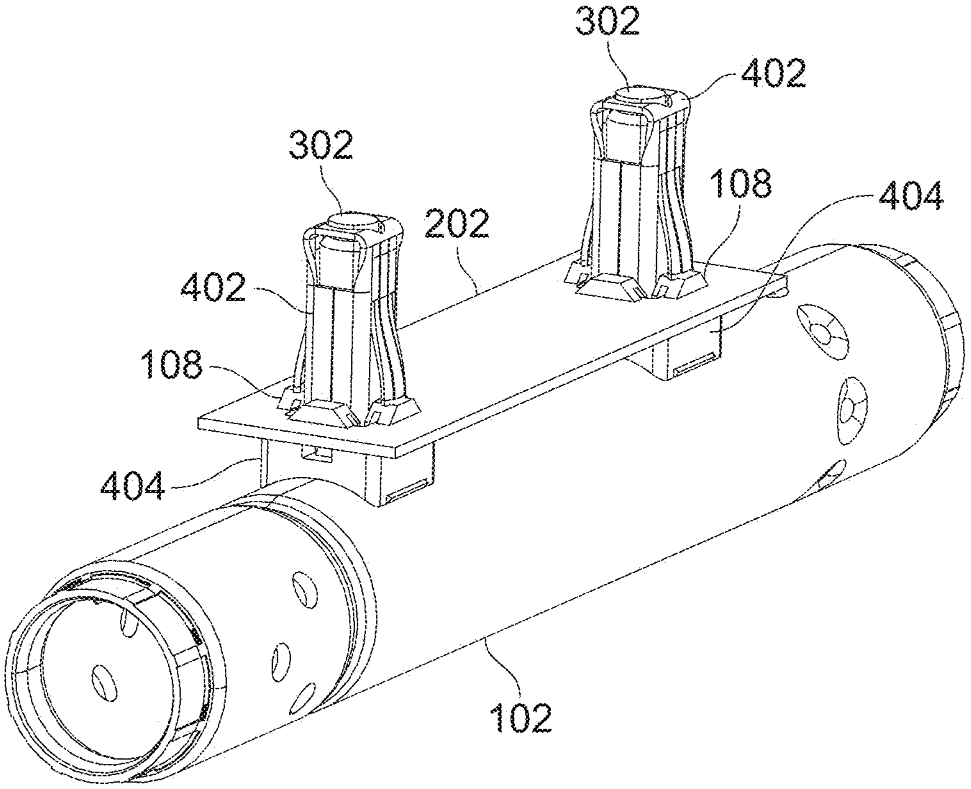
FIG. 4 illustrates an example aspect of an air bag fixation attached to a substrate (e.g. car chassis).

FIG. 4 shows an aspect of an air bag 102 attached to a chassis via air bag fixations 402. The fixation 402 shares many similar features to the air bag fixation 104 discussed above, and like reference numerals are used to denote like parts sharing the same attributes. The air bag fixations have spacers 404 sandwiched between the fixations 402 and the air bag to ensure play between the parts is minimized and to hold the two parts at a pre-set distance (by selecting the width of spacer 404). The fixations are provided with resilient barbs 108 to pass through an aperture 304 of the substrate and then not return therethrough without external input. The spacer prevents continued travel of the fixation through the aperture, as the fixation interferes with the spacer, and the fixation cannot pass by, over, or through the spacer. This ensures that the substrate is held a fixed distance from the air bag by the air bag fixations.

The spacer further comprises a nose 602 arranged to be located within an aperture of a substrate. The nose therefore provides a locating feature for the substrate to ensure proper alignment of at least the spacer, and optionally the cage, with the substrate. Optionally the nose comprises one or more grasping fingers 604 arranged to grip the substrate, thereby ensuring the position of the spacer relative to the substrate may not change during installation of the fixation. Preferably, in this instance, the spacer is provided upon an end of the fixation that is intended for first insertion into the substrate, before other elements of the fixation. The installation process then shifts the position of the spacer relative to the fixation into a final resting place. Optionally and/or alternatively, the nose comprises one or more abutment surfaces 606 arranged to cooperate with a resilient barb.

As the air bag can be pre-provided with the fixations, the air bag is placed into a ready to assemble state with no further fixings, assembly is intuitive, merely requiring one part to be urged towards another, simplifying assembly.

The fixations may be provided with a coating having dielectric properties. Nevertheless, the fixation 402 and/or the spacer 404 may also be formed from an electrical isolator, such as a non-conductive polymer.

The fixation may be easily removed by reversing the assembly process similarly to that as previously described.

No particular fixing is required on the chassis, other than an aperture sized to receive the fixation. There is no need for a welded nut or the like on the body in white. The aperture may take the form of a square or other shape corresponding to the cross section of the fixation. Multiple fixations may be used on the air bag, as shown in the figures, or a single fixation may be sufficient.

The omission of separate multi-part fixations (such as a nut and bolt) reduces construction time and weight.

Figure 5:
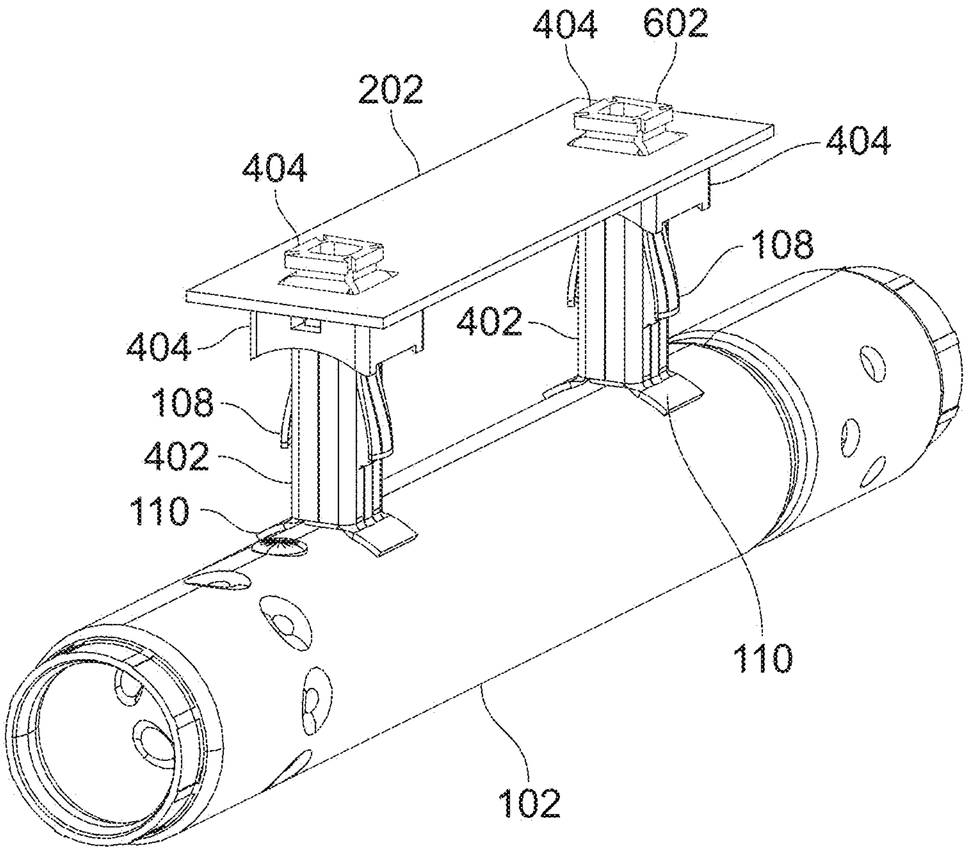
FIG. 5 illustrates an intermediate position where the air bag is partially attached to the substrate via the air bag fixations.
Figure 6A:
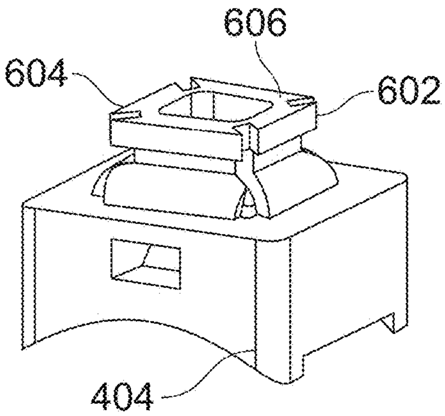
FIGS. 6*a*, 6*b*, 6*c*, and 6*d* illustrate the use of the air bag fixation according to an aspect that, respectively, is (a) a spacer; (b) a barbed fixation; (c) associating the fixations to the studs of an air bag; and (d) attaching the fixations to the studs of an air bag.
Figure 6B:
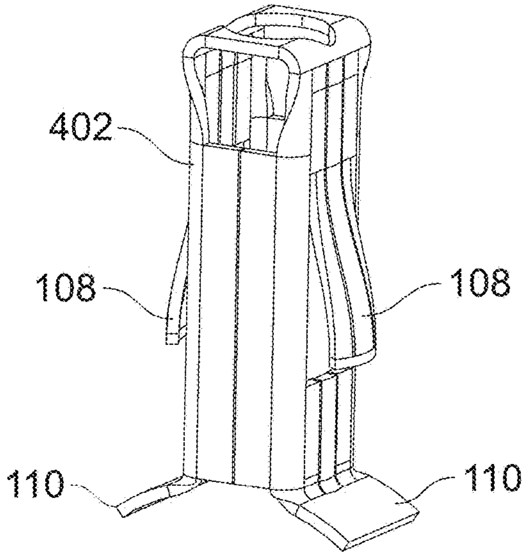
Figure 6C:
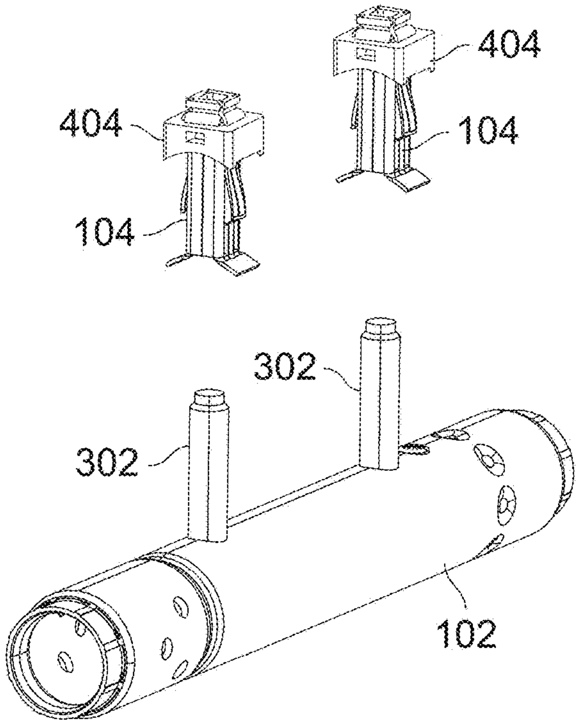
Figure 6D:
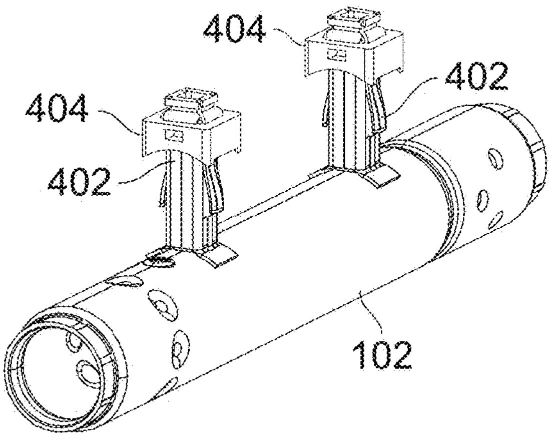

FIG. 5 shows an intermediate position where the air bag is partially attached to the substrate via the air bag fixations. The spacers, via the nose 602 are associated with the substrate and the fixations inserted into the spacers, ready for the air bag to be urged towards the substrate thereby forcing the barbs of the fixation through the spacers and the aperture to hold the assembly together.

This is further illustrated in FIG. 6(*a*)-(*d*) which show (a) a spacer, (b) a fixation, (c) the spacer upon the fixation, and association of the parts with studs arranged on the air bag, and (d) location of the fixation upon the air bag with spacers in place ready to be urged towards a substrate. The fixation is provided with lower resilient members 110 which function similarly to those as previously described. The fixations are attached to the air bag studs by any suitable means, such as snap fit or by rotation. The curved surface of the air bag abutting the lower resilient members prevents reverse rotation once the fixation is clinched down sufficiently.

It will be appreciated by persons skilled in the art that the above detailed examples have been described by way of example only and not in any limitative sense, and that various alterations and modifications are possible without departing from the scope of the disclosure as defined by the appended claims. Various modifications to the detailed examples described above are possible.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

While the present method and/or system has been described with reference to certain implementations, it will be understood by those skilled in the art that various changes may be made, and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An air bag fixation suitable to attach an air bag to a substrate , the air bag fixation comprising:

a cage arranged to receive a stud of the air bag;

at least one resilient barb arranged to catch the substrate;

at least one distance regulator arranged to, in use, maintain the substrate a predetermined distance from the air bag; and at least one resilient member arranged to hold the position of the air bag fixation relative to a curved surface of the air bag.

2. The air bag fixation of claim 1, wherein the cage comprises an attachment mechanism to adhere the cage to the stud.

3. The air bag fixation of claim 2, wherein the attachment mechanism is a reversible attachment mechanism.

4. The air bag fixation of claim 1, wherein the at least one resilient barb is formed integrally with the cage.

5. The air bag fixation of claim 1, wherein the at least one resilient barb comprises a ramped catchment surface.

6. The air bag fixation of claim 1, wherein the at least one distance regulator is arranged, in use, between the at least one resilient barb and the at least one resilient member.

7. The air bag fixation of claim 1, wherein the at least one distance regulator is formed integrally with the cage.

8. The air bag fixation of claim 1, wherein the at least one distance regulator is a spacer arranged to locate about the cage and at least partially surround the cage.

9. The air bag fixation of claim 8, wherein the spacer comprises a planar surface arranged opposite a curved face, wherein the curved face is concave when observed from the outside.

10. The air bag fixation of claim 9, wherein the spacer further comprises a nose arranged to be located within an aperture of the substrate, wherein the nose comprises one or more grasping fingers arranged to grip the substrate.

11. The air bag fixation of claim 1, wherein the at least one resilient member is formed integrally with the cage.

12. The air bag fixation of claim 1, wherein the air bag fixation is at least partially coated with a coating having dielectric properties.

13. The air bag fixation of claim 1, wherein an exterior cross section of the cage describes a polygon.

14. The air bag fixation of claim 1, wherein the air bag fixation is a reversible air bag fixation comprising a removal tab arranged to urge the at least one resilient barb towards an interior of the cage.

15. An air bag fixation for attaching an air bag module to a vehicle substrate, the air bag fixation comprising:

a body defining a central channel configured to receive a stud of an air bag module;

at least one resilient barb extending outwardly from the body and configured to engage the vehicle substrate to retain the air bag fixation thereto;

at least one distance regulator projecting from the body and configured to space the vehicle substrate a fixed distance from the air bag module when the air bag fixation is installed; and at least one spring arm extending from the body and configured to bear against a curved outer surface of the air bag module to maintain the position of the air bag fixation relative to the air bag module.

16. The air bag fixation of claim 15, wherein the body, the at least one resilient barb, the at least one distance regulator, and the at least one spring arm are formed as a unitary, one-piece structure.

17. The air bag fixation of claim 15, wherein the at least one resilient barb is deflectable inwardly toward the body to permit withdrawal of the air bag fixation from the vehicle substrate.

18. The air bag fixation of claim 15, wherein the at least one resilient barb comprises an angled lead-in surface configured to cam the at least one resilient barb inwardly during insertion through the vehicle substrate, and a catch surface configured to engage a rear face of the vehicle substrate following insertion.

19. The air bag fixation of claim 15, wherein the central channel has a polygonal cross-sectional profile configured to resist rotation of the stud relative to the body.

20. The air bag fixation of claim 15, wherein the body is at least partially coated with an electrically resistive coating.

* * * * *